(12) United States Patent
Kim

(10) Patent No.: US 11,565,211 B2
(45) Date of Patent: *Jan. 31, 2023

(54) APPARATUS AND METHOD FOR CONTROLLING DISPLAY OF EPG INFORMATION

(71) Applicant: LG ELECTRONICS INC., Seoul (KR)

(72) Inventor: Sung Ho Kim, Jeollabuk-do (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/495,613

(22) Filed: Oct. 6, 2021

(65) Prior Publication Data

US 2022/0023795 A1    Jan. 27, 2022

Related U.S. Application Data

(63) Continuation of application No. 16/452,933, filed on Jun. 26, 2019, now Pat. No. 11,154,808, which is a
(Continued)

(30) Foreign Application Priority Data

Jun. 22, 2007    (KR) ................. 10-2007-0061502

(51) Int. Cl.
     *B01D 50/20*      (2022.01)
     *H04N 21/472*      (2011.01)
     (Continued)

(52) U.S. Cl.
     CPC ............. *B01D 50/20* (2022.01); *B01D 27/06* (2013.01); *B01D 45/12* (2013.01);
(Continued)

(58) Field of Classification Search
     CPC ......... H04N 21/4316; H04N 21/47214; H04N 21/482; H04N 21/47; H04N 5/445;
(Continued)

(56) References Cited

U.S. PATENT DOCUMENTS 5,844,620 A    12/1998    Coleman et al.
6,057,890 A    5/2000    Virden et al.
(Continued)

FOREIGN PATENT DOCUMENTS

CN      1164948      11/1997
CN      1698351      11/2005
(Continued)

OTHER PUBLICATIONS

International Search Report dated Oct. 23, 2008 for International Application PCT/KR2008/003562.
(Continued)

*Primary Examiner* — Anthony Bantamoi
(74) *Attorney, Agent, or Firm* — Lee, Hong, Degerman, Kang & Waimey PC

(57) ABSTRACT

A method for controlling display of information on a display device includes storing information corresponding to a broadcast program guide. When a signal is received based on activation of a specific key while the first broadcast program is displayed on a screen, information on the first broadcast program and information on a second program to be broadcast after the first broadcast program is detected. The first broadcast program is then displayed in a first region of the screen simultaneously with the information on the first broadcast program and the information on the second broadcast program in a second region of the screen.

18 Claims, 7 Drawing Sheets

Related U.S. Application Data continuation of application No. 12/665,982, filed as application No. PCT/KR2008/003562 on Jun. 23, 2008, now Pat. No. 10,382,715.

(51) Int. Cl.

| | | |
|---|---|---|
| *H04N 21/431* | (2011.01) | |
| *H04N 21/482* | (2011.01) | |
| *B01D 27/06* | (2006.01) | |
| *B01D 45/12* | (2006.01) | |
| *B01D 46/00* | (2022.01) | |
| *B01D 46/10* | (2006.01) | |
| *B01D 46/42* | (2006.01) | |
| *B01D 46/52* | (2006.01) | |

(52) U.S. Cl.
CPC ..... *B01D 46/0005* (2013.01); *B01D 46/0015* (2013.01); *B01D 46/0095* (2013.01); *B01D 46/10* (2013.01); *B01D 46/4227* (2013.01); *B01D 46/521* (2013.01); *B01D 46/525* (2013.01); *B01D 46/527* (2013.01); *H04N 21/4316* (2013.01); *H04N 21/47214* (2013.01); *H04N 21/482* (2013.01); *B01D 2265/06* (2013.01); *B01D 2267/40* (2013.01); *B01D 2271/022* (2013.01); *Y10T 29/49826* (2015.01)

(58) Field of Classification Search
CPC .............. H04N 21/431; B01D 2267/40; B01D 2271/022; Y10T 29/49826
See application file for complete search history.

(56) References Cited

U.S. PATENT DOCUMENTS

| | | | |
|---|---|---|---|
| 6,311,011 B1 | 10/2001 | Kuroda | |
| 6,563,515 B1 | 5/2003 | Reynolds et al. | |
| 7,076,734 B2 | 7/2006 | Wolff | |
| 7,096,185 B2 | 8/2006 | Reichardt et al. | |
| 7,137,135 B2 | 11/2006 | Schein et al. | |
| 7,546,621 B2 | 6/2009 | LaJoie et al. | |
| 9,071,795 B2 | 6/2015 | McElhatten et al. | |
| 10,382,715 B2 | 8/2019 | Kim | |
| 11,154,808 B2 | 10/2021 | Kim | |
| 2002/0010926 A1 | 1/2002 | Lee | |
| 2002/0078450 A1 | 6/2002 | Bennington et al. | |
| 2002/0087983 A1 | 7/2002 | Son et al. | |
| 2002/0170057 A1 | 11/2002 | Barrett | |
| 2002/0174430 A1 | 11/2002 | Ellis et al. | |
| 2003/0117527 A1 | 6/2003 | Smith | |
| 2004/0030599 A1 | 2/2004 | Sie et al. | |
| 2004/0197082 A1 | 10/2004 | Yim | |
| 2005/0144639 A1 | 6/2005 | Kim | |
| 2005/0166230 A1 | 7/2005 | Gaydou et al. | |
| 2006/0020966 A1 | 1/2006 | Poslinski | |
| 2006/0020971 A1 | 1/2006 | Poslinski | |
| 2006/0242666 A1 | 10/2006 | Alba et al. | |
| 2007/0017347 A1 | 1/2007 | Choi | |
| 2007/0022450 A1 | 1/2007 | Kim et al. | |
| 2007/0061840 A1 | 3/2007 | Walter et al. | |
| 2007/0288958 A1 | 12/2007 | Knudson et al. | |
| 2008/0107392 A1 | 5/2008 | Grannan | |
| 2008/0320523 A1 | 12/2008 | Morris et al. | |
| 2009/0077589 A1 | 3/2009 | Boyer | |

FOREIGN PATENT DOCUMENTS

| | | |
|---|---|---|
| CN | 1929595 | 3/2007 |
| KR | 10-2004-0051429 | 6/2004 |
| KR | 10-2005-0122884 | 12/2005 |
| KR | 10-2007-0009058 | 1/2007 |
| KR | 10-0686878 | 2/2007 |

OTHER PUBLICATIONS

Chinese Office Action dated May 25, 2011 issued in Application 200880021011.0 (with Translation).
European Office Action dated May 9, 2012 issued in Application 07 76 6521.
European Office Action dated Jan. 23, 2013 for Application 08 766 521.2.
U.S. Office Action dated Apr. 24, 2021 issued in U.S. Appl. No. 12/665,982.
U.S. Office Action dated Dec. 5, 2012 issued in U.S. Appl. No. 12/665,982.
U.S. Office Action dated May 18, 2015 issued in U.S. Appl. No. 12/665,982.
U.S. Office Action dated Jun. 16, 2016 issued in U.S. Appl. No. 12/665,982.
U.S. Office Action dated Feb. 15, 2017 issued in U.S. Appl. No. 12/665,982.
U.S. Office Action dated Aug. 14, 2017 issued in U.S. Appl. No. 12/665,982.
U.S. Office Action dated Mar. 22, 2018 issued in U.S. Appl. No. 12/665,982.
U.S. Office Action dated Aug. 27, 2018 issued in U.S. Appl. No. 12/665,982.
United States Patent and Trademark Office U.S. Appl. No. 16/452,933, Office Action dated Jan. 25, 2021, 15 pages.

APPARATUS AND METHOD FOR CONTROLLING DISPLAY OF EPG INFORMATION

CROSS-REFERENCE TO RELATED APPLICATIONS

This application is a continuation of U.S. patent application Ser. No. 16/452,933, filed on Jun. 26, 2019, which is a continuation of U.S. patent application Ser. No. 12/665,982, filed on Dec. 22, 2019, now U.S. Pat. No. 10,382,715, which is the National Stage filing under 35 U.S.C. 371 of International Application No. PCT/KR2008/003562, filed on Jun. 23, 2008, which claims the benefit of earlier filing date and right of priority to Korean Patent Application No. 10-2007-0061502, filed Jun. 22, 2007, the contents of which are all incorporated by reference herein in their entirety.

BACKGROUND

1. Field

The present invention relates to a broadcasting receiver, and more particularly, to a broadcasting receiver for displaying information on a currently watched program and information on a scheduled broadcast program on a screen, and a broadcast program providing method using the same.

2. Background

Recently, the number of channels provided by a broadcasting station has remarkably increased due to digital broadcasting, cable broadcasting, etc.

Accordingly, a technique capable of efficiently confirming information on numerous channels by a user has been proposed.

As one approach to such a technique is an electronic program guide (EPG) technique. The EPG is an application program used together with a digital subscriber set-top box to make a program schedule in which programs and summaries for respective channels are contained.

The EPG provides a guide which is the same as a printed television (TV) program guide and uses remote control equipment. The EPG has functions such as pay-per-view program order, program search for themes and types, and video recording.

However, when a user is desired to confirm information on a scheduled broadcast program through the EPG information, if a specific remote controller corresponding to a broadcasting receiver is lost or out of order, it is difficult to confirm detailed information on a specific channel, and the user should operate an additional remote controller in order to confirm a scheduled broadcast program while watching a broadcast program.

Moreover, if the user is desired to set a recording reservation function for a scheduled broadcast program, the user can not watch for a moment a currently watched program by setting a recording program by movement to a corresponding menu and it is complicated to manipulate the remote controller.

An object of the present invention devised to solve the problem lies on providing a broadcasting receiver which can confirm information on a scheduled broadcast program as well as information on a currently watched broadcast program by a simple manipulation of a remote controller, and a broadcast program providing method using the same.

Another object of the present invention devised to solve the problem lies on providing a broadcasting receiver which can automatically offer information on scheduled broadcast programs without inputting an additional key and can reserve and cancel program recoding by a simple key manipulation without stopping a currently watched broadcast program, and a broadcast program providing method using the same.

The object of the present invention can be achieved by providing a method for providing information on broadcast programs. The method includes: receiving and storing information on a broadcast program guide; if a user inputs a specific key while watching a broadcast program, detecting information on a currently watched broadcast program and information on a scheduled broadcast program; and displaying the information on the currently watched broadcast program and the information on the scheduled broadcast program in a partial region of a currently watched screen.

In another aspect of the present invention, provided herein is a broadcasting receiver including: a memory for receiving information on a broadcast program guide and storing information on channels; a controller for detecting information on a currently watched broadcast program and information on a scheduled broadcast program when a user inputs a specific key while watching a broadcast program; and a display for displaying the information on the currently watched broadcast program and the information on the scheduled broadcast program information in a partial region of a currently watched screen.

The present invention displays information on a currently watched broadcast program and information on a scheduled broadcast program on a screen by a simple key operation and can set or cancel a recording reservation for a broadcast program by using the displayed information, thereby increasing user's convenience. Further, information on broadcast programs can be easily obtained without interrupting viewing of the currently watched broadcast program.

BRIEF DESCRIPTION OF THE DRAWINGS

The embodiments will be described in detail with reference to the following drawings in which like reference numerals refer to like elements wherein.

DETAILED DESCRIPTION

Hereinafter, a broadcasting receiver and a broadcast program information providing method using the same according to the present invention will be described in detail with reference to the accompanying drawings.

Figure 1:
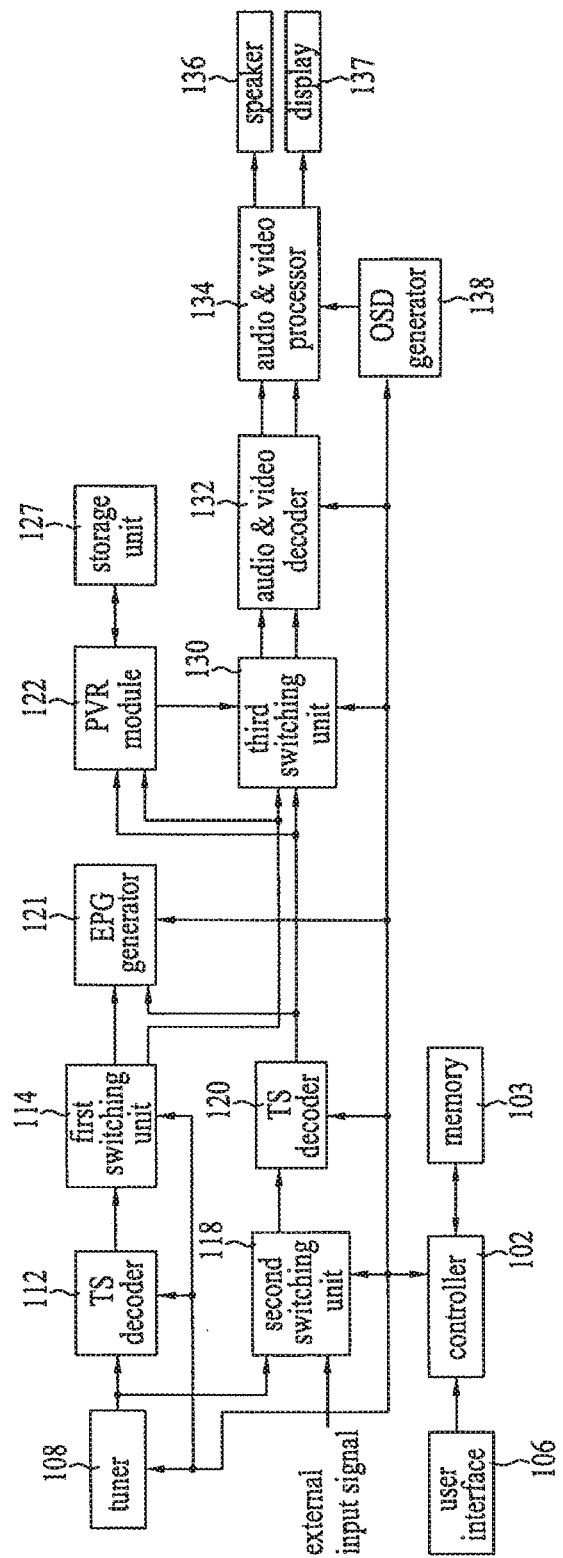
FIG. 1 is a schematic block diagram of a broadcasting receiver according to an exemplary embodiment of the present invention.

FIG. 1 is a schematic block diagram of a broadcasting receiver providing information on broadcast programs according to an exemplary embodiment of the present invention.

Referring to FIG. 1, a broadcasting receiver according to an exemplary embodiment of the present invention is a TV providing information on a currently watched broadcast program and information on a scheduled broadcast program when a confirmation key of a remote controller is inputted. The broadcasting receiver includes a controller 102 for controlling the TV as a whole, a memory 103 for storing received EPG information, a tuner 108 for tuning a broadcasting channel by the control of the controller 102, a transport stream (TS) decoder 112 for processing a digital broadcasting signal, and an NTSC (NT) decoder 120 for processing an analog broadcasting signal. The broadcasting receiver also includes an EPG generator 121 for extracting EPG information from side information contained in the digital or analog broadcasting signal and generating an EPG, a personal video recorder (PVR) module 122 for recording a received broadcast program by the selection of a user or temporarily storing the received broadcast program according to a time shift function, and an audio and video processor 134 for processing the digital or analog broadcasting signal, or broadcasting data provided by the PVR module 122 to be outputted through a speaker 136 and a display 137.

The controller 102 controls the TV as a whole. Especially, if a user inputs a confirmation key while watching the TV, the controller 102 searches the EPG which has received from a broadcasting station and previously been stored in the memory 103 and controls the display 137 to display information on scheduled broadcast program together with information on a currently watched broadcast program on a screen.

The information on the currently watched broadcast program provides the broadcasted amount of the currently watched broadcast program as a progress bar type to display a broadcast program progress state.

Information on broadcast programs detected from the memory 103 and provided by the controller 102 is information on one broadcast program which is to be broadcasted directly after the currently watched broadcast program is ended, or information on at least one broadcast program which is to be broadcasted after the currently watched broadcast program is ended.

When providing the information on the scheduled broadcast programs, the controller 102 provides up/down/left/right arrow keys. If a user selects a specific arrow key, information on a scheduled broadcast program is sequentially shifted to information on the next scheduled broadcast program. Alternatively, the information on the scheduled broadcast programs is displayed by automatic sliding conversion at intervals of a setting time.

If the user selects the left/right keys from the up/down/left/right arrow keys displayed in the information on the scheduled broadcast program, information on programs to be broadcasted through the same channel as the currently watched broadcast program is provided. If the user selects the up/down keys, information on programs to be broadcasted through other channels at the same time period as the scheduled broadcast program is provided.

If a key signal for making a recording reservation for a specific broadcast program is inputted by the user under the state that information on broadcast programs is displayed, the recording reservation for a selected program can be set or cancelled.

A user interface 106 is a keypad provided on a TV body or a remote controller. The user interface 106 transmits various commands or information inputted by the user to the controller 102. Especially, if the user inputs a confirmation key signal while watching a broadcast program, the user interface 106 provides the confirmation key signal to the controller 102 and provides a selection key signal inputted by the user on an on-screen display (OSD) to the controller 102.

The tuner 108 tunes channels out of broadcasting data inputted through a sky wave or a cable by the control of the controller 102. A digital broadcasting signal and an analog broadcasting signal among broadcasting signals received through the tuned channel are respectively supplied to the TS decoder 112 for processing the digital broadcasting signal and the NT decoder 120 for processing the analog broadcasting signal.

The TS decoder 112 decodes the digital broadcasting signal provided by the tuner 108, converts the decoded signal into audio and video streams and a data stream, and transmits the converted streams to a first switching unit 114.

The first switching unit 114 transmits the audio and video streams and the data stream to the EPG generator 121 by the control of the controller 102.

The EPG generator 121 generates an EPG with detailed information on broadcast programs by using side data contained in a received broadcast program and transmits the EPG to the memory 103.

A second switching unit 118 receives the analog broadcasting signal from the tuner 108 and an external input signal and selectively transmits any one of the two signals to the NT decoder 120 by the control of the controller 102.

The NT decoder 120 for processing the analog broadcasting signal receives the analog broadcasting signal or the external input signal from the second switching unit 118, decodes the analog broadcasting signal or the external input signal to audio and video data, and transmits audio and video streams and a data stream to the EPG generator 121 by the control of the controller 102.

The PVR module 122 receives the audio and video streams and the data stream of the digital broadcasting signal by the control of the controller 102 and stores them in a storage unit 127. Alternatively, the PVR module 122 MPEG encodes audio and video data of the analog broadcasting signal to the audio and video streams and stores the encoded streams in the storage unit 127.

Further, when receiving a broadcast program for which recording reservation is selected by the user, the PVR module 122 stores the corresponding broadcast program in the storage unit 127.

A third switching unit 130 selects at least one of the broadcast program received according to the control of the controller 102 and the broadcast program stored in the PVR module 122 and transmits the selected program to an audio and video decoder 132.

The audio and video decoder 132 decodes the audio and video streams to video and audio data and provides the audio and video data to the audio and video processor 134, when the audio and video streams are provided thereto. If the audio and video data is provided to the audio and video decoder 132, the audio and video decoder 132 provides the audio and video data to the audio and video processor 134.

The audio and video processor 134 processes at least one of the audio and video data provided by the audio and video decoder 132 and outputs the processed audio data and video data to the speaker 136 and the display 137, respectively. The audio and video processor 134 mixes OSD data provided by the controller 102 with the video data and transmits the mixed data to the display 137.

An OSD generator 138 generates an OSD signal for information on a currently watched broadcast program and information on a scheduled broadcast program when an EPG is executed under the control of the controller 102 and provides the OSD signal to the display 137.

A broadcast program providing method of the broadcasting receiver having the above-described construction will now be described with reference to FIG. 2.

Figure 2:
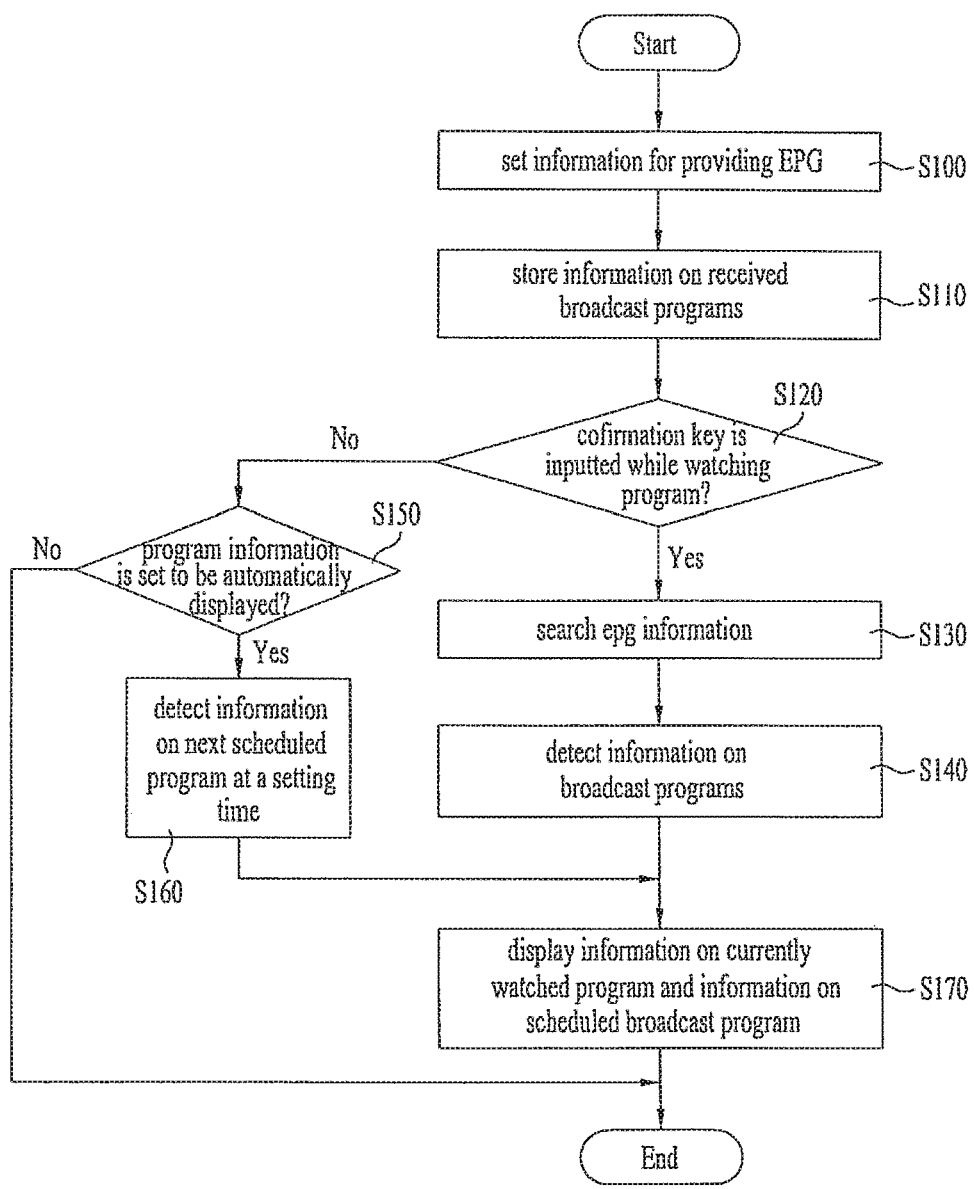
FIG. 2 is a flow chart illustrating a method of providing information on broadcast programs of a broadcasting receiver according to an exemplary embodiment of the present invention.

FIG. 2 is a flow chart illustrating a broadcast program providing method of a broadcasting receiver according to an exemplary embodiment of the present invention. If a user selects a menu in order to set information for providing an EPG through the interface 106 of the TV and inputs information for providing broadcast programs by using an OSD displayed on a screen (step S100), the information for providing the EPG is set and stored in the memory 103 and information on broadcast programs for each channel received from a broadcasting station is stored (step S110). If the user inputs a confirmation key by using a remote controller while watching a broadcast program received through a specific channel (step S120), the controller 102 searches information on a currently watched broadcast program and EPG information on scheduled broadcast programs (step S130). Thereafter, the controller 102 detects information on broadcast programs from the memory 103 (step S140).

Next, information on the currently watched broadcast program and information on the scheduled broadcast program to be broadcasted after the currently watched broadcast program is ended are displayed on a partial region of a TV screen (step S170).

Figure 3A:
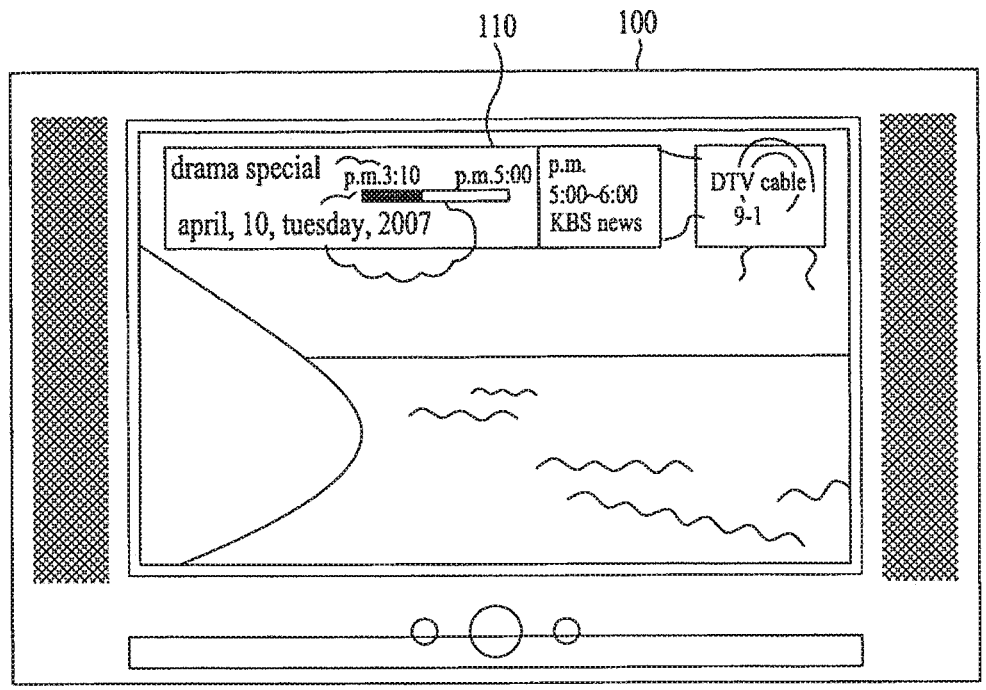
FIGS. 3A to 3C illustrate TV screens for providing information on broadcast programs according to an exemplary embodiment of the present invention.
Figure 3B:
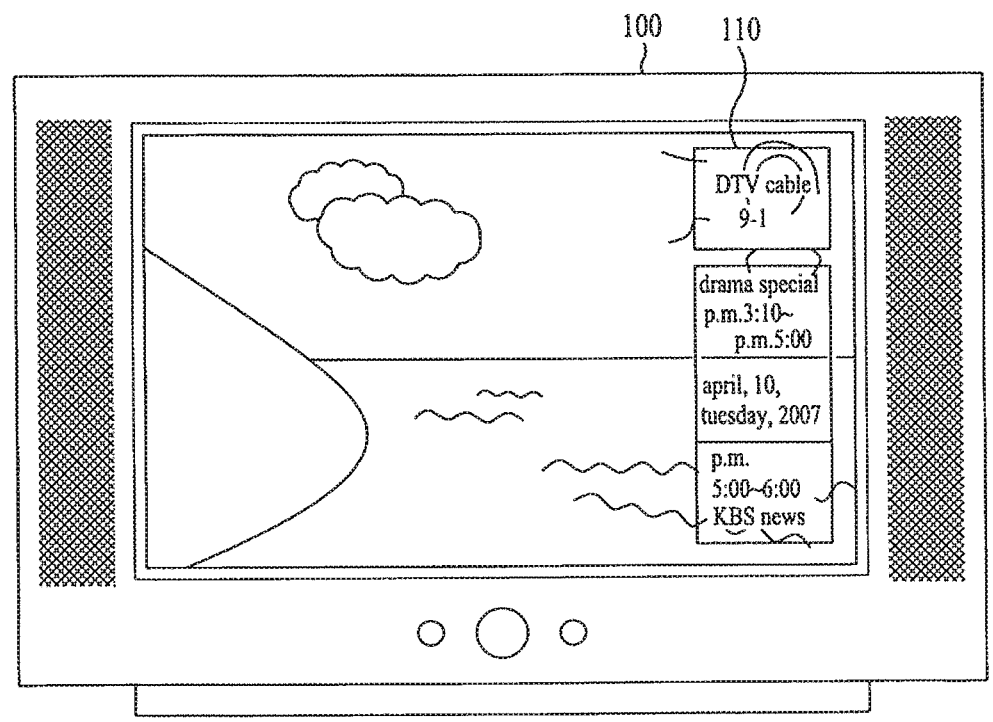

Information 110 on broadcast programs may be displayed in a partial region of an upper part of a screen of a TV 100 as shown in FIG. 3A or displayed in a partial region of a side part of the screen as shown in FIG. 3B, so that the broadcast program information 110 does not occupy many parts of a currently watched screen.

As illustrated in FIG. 3A, the information 110 on a next scheduled program provided together with information on a currently watched broadcast program in a partial region of a viewing screen according to an input of the confirmation key by the user may be information on one program which is to be broadcasted directly after the currently watched broadcast program is ended or information on at least one program which is to be broadcasted after the currently watched broadcast program is ended.

If there is information on a plurality of programs to be displayed on the screen of the TV 100, the controller 102 controls the TV screen to display broadcast program information by conversion to information on a next program in order according to a key signal inputted through a remote controller by a user setting or to display broadcast program information by automatic sliding conversion at intervals of a setting time.

Figure 3C:
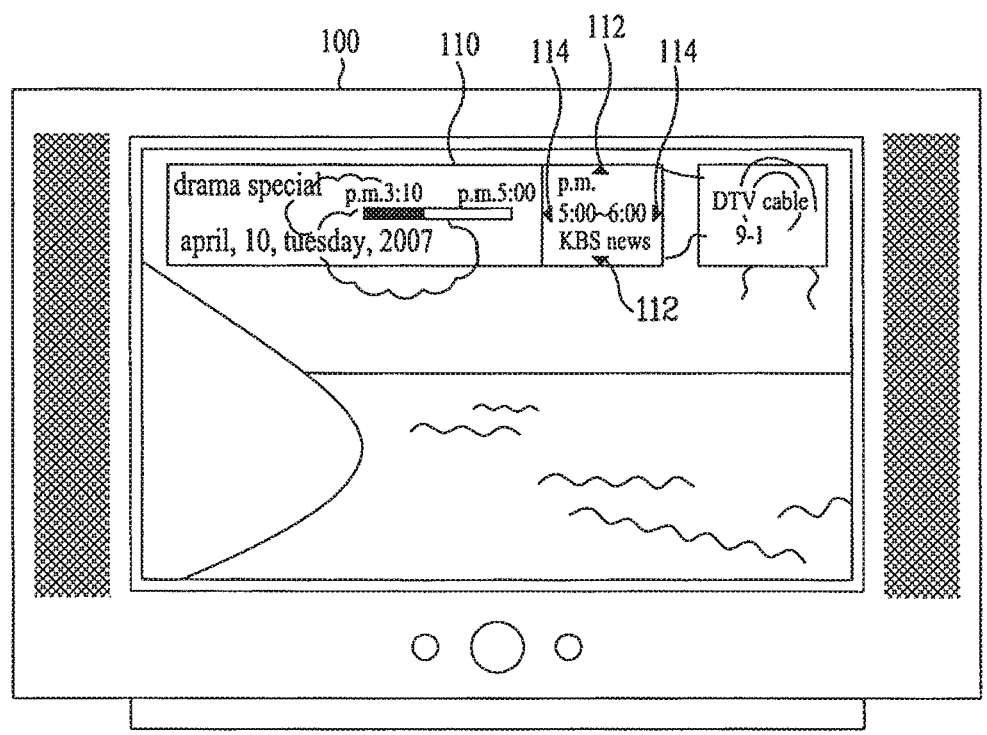

As illustrated in FIG. 3C, if there is information on a plurality of programs to be broadcasted, arrow keys 112 and 114 are provided at upper, lower, left and right sides of a scheduled broadcast program. If a user selects a specific arrow key, information on the scheduled broadcast program is converted into information on the next program and the converted information is displayed.

If the left/right keys 114 are selected among the up/down/left/right keys 112 and 114 displayed in the information of the scheduled broadcast program, information on programs which is to be broadcasted through the same channel as a currently watched broadcast program is provided. If the up/down keys 112 are selected, information on programs which is to be broadcasted through other channels at the same time period as the scheduled broadcast program is provided.

Figure 4A:
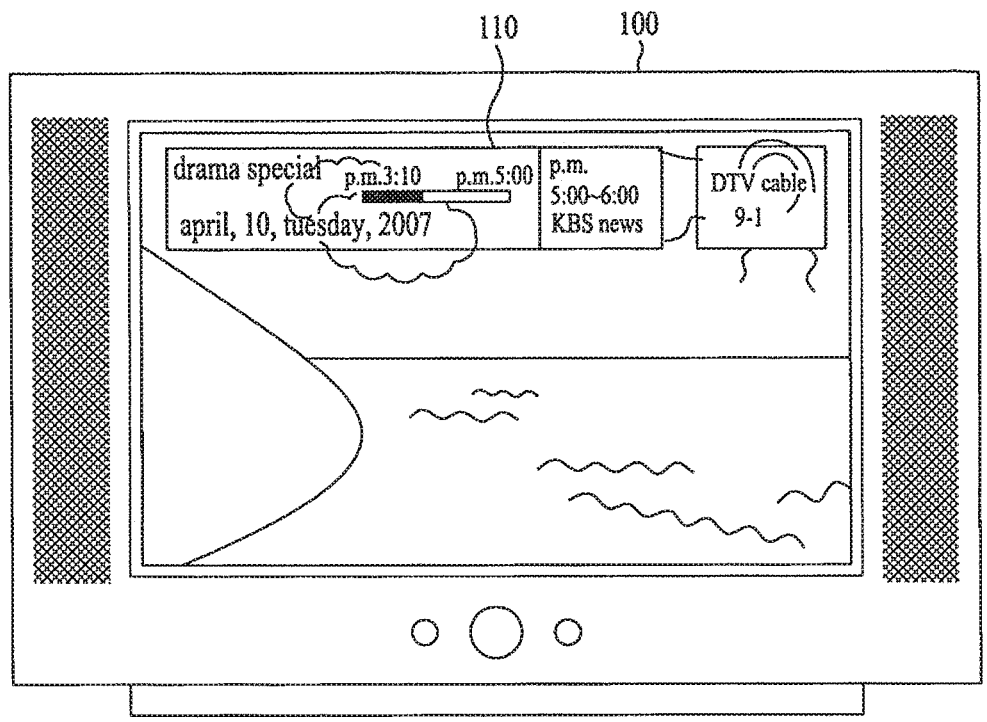
FIGS. 4A and 4B illustrate TV screens for providing information on a plurality of broadcast programs according to an exemplary embodiment of the present invention.
Figure 4B:
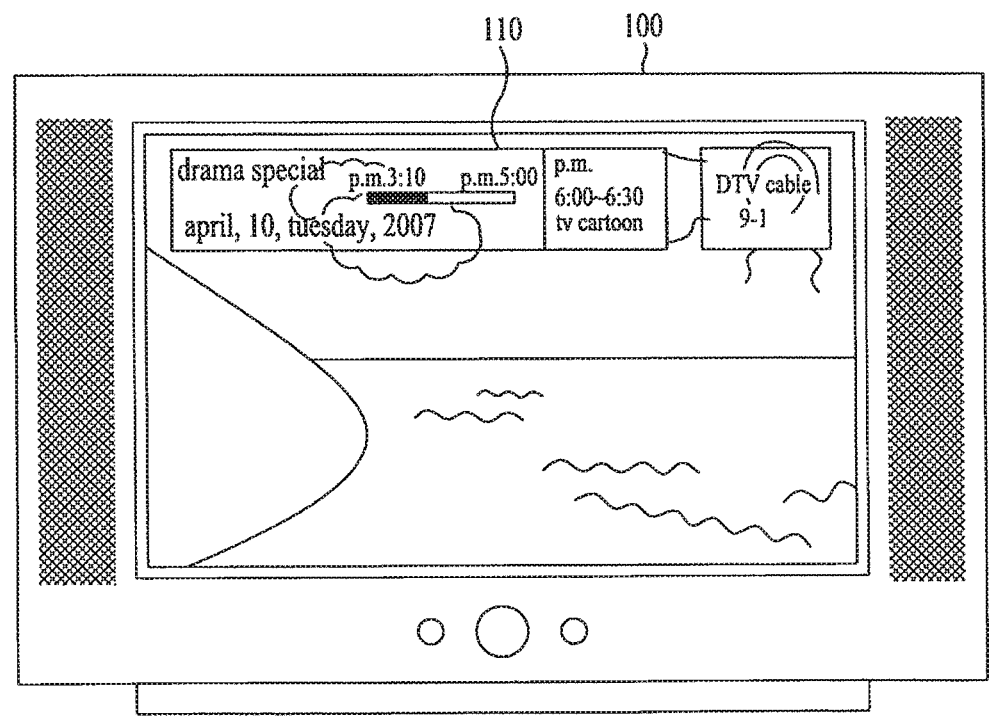

Referring to FIGS. 4A and 4B, displayed information on scheduled broadcast programs is changed when there is information on a plurality of scheduled broadcast programs. While a broadcast program entitled 'Drama Special' is being provided by the selection of a user, the controller 102 provides information on a currently watched program and information on a next scheduled program by an input of a confirmation key or by information set to automatically display a program.

Thereafter, the controller 102 displays information on a plurality of broadcast programs which is to be broadcasted after the currently watched program is ended in broadcasting order by sliding conversion at intervals of a setting time.

For example, referring to FIG. 4A, information on a scheduled broadcast program 'KBS News' which is scheduled after the currently watched program is ended is displayed together with the information on the currently watched program. If a setting time elapses, information on a broadcast program which is to be broadcasted after the program 'KBS News' is ended, that is, information on a program 'TV Cartoon' is displayed together with the information on the currently watched program as shown in FIG. 4B.

In a method of displaying a plurality of broadcast programs, program information may be displayed with time intervals according to user setting or displayed by information conversion one by one according to an arrow key signal inputted by the user.

Meanwhile, while the user is watching a broadcast program received through a specific channel, if a confirmation key signal is not inputted even though it is almost time to end the corresponding broadcast program in step S120, the controller 102 checks whether the broadcast program information is set to be automatically displayed by confirming information for providing the EPG set in the memory 103 (step S150). If the program information is set to be automatically displayed, the controller 102 detects information on a next scheduled program at a setting time before the currently watched program is ended (step S160). The controller 102 displays information on the currently watched program and information on the next scheduled program (step S170).

If a recording reservation signal for the displayed scheduled broadcast program is inputted by the user under the state that information on broadcast programs is displayed, the controller 102 sets the corresponding broadcast program selected by the user to be recorded. If a cancel signal for the broadcast program for which recording is scheduled is inputted, a recording reservation is cancelled.

Figure 5:
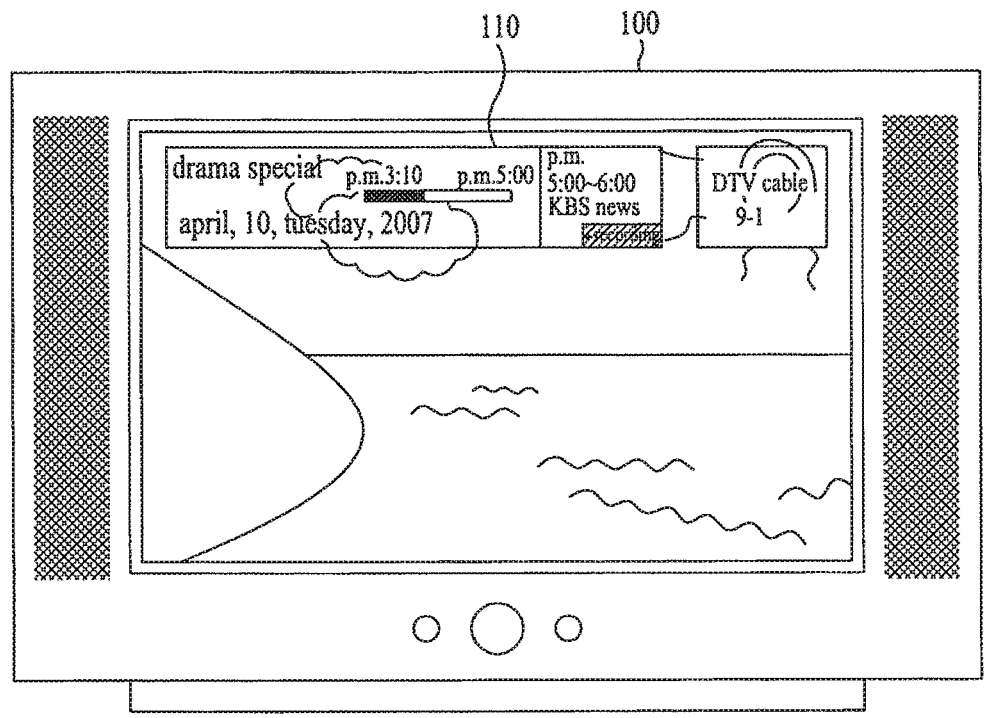
FIG. 5 illustrates a TV screen for setting a recording reservation according to an exemplary embodiment of the present invention.

Referring to FIG. 5, if the user inputs a confirmation key while watching a broadcast program, information on a currently watched broadcast program and information on a scheduled broadcast program are displayed at an upper side of a screen. If the user sets a recording reservation for the scheduled program 'KBS News' which is to be broadcasted after the current program 'Drama Special' is ended, recording reservation setting is displayed in the information on the scheduled broadcast program. The recording reservation setting can be cancelled by a simple key operation.

Figure 6:
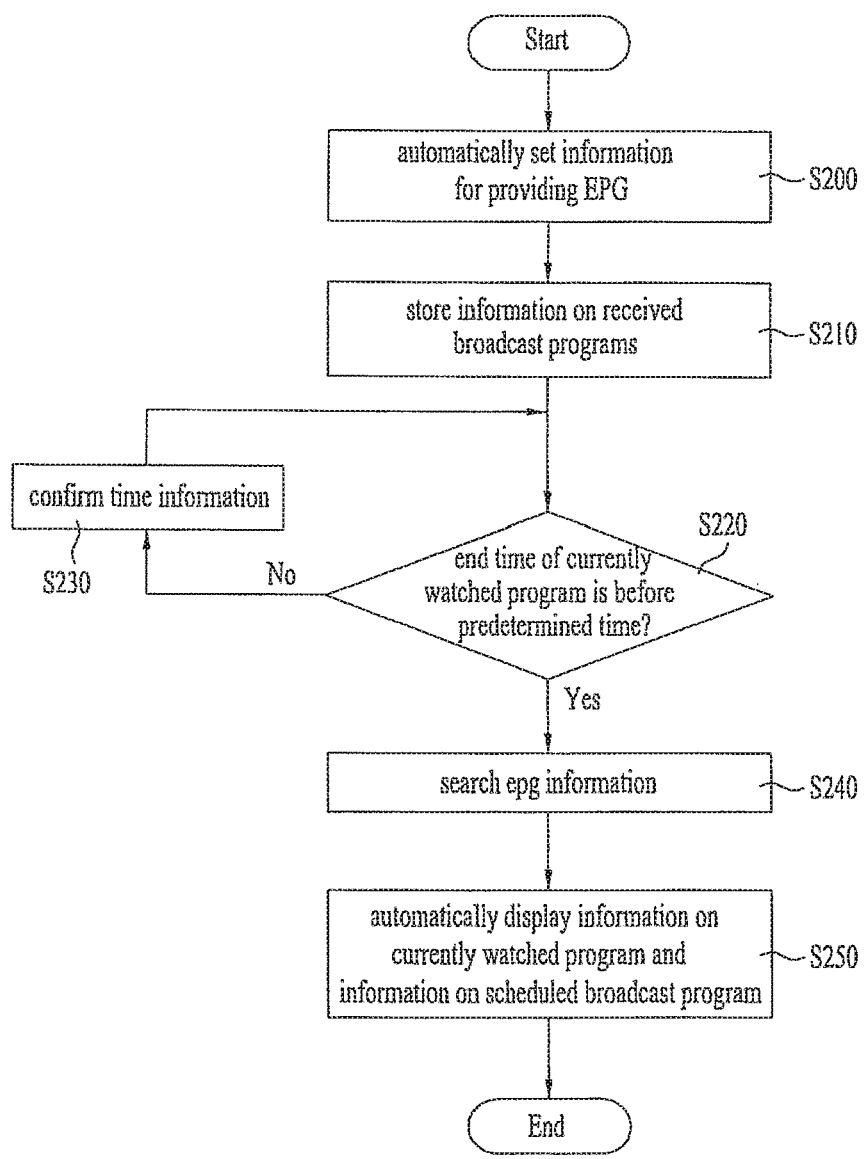
FIG. 6 is a flow chart illustrating a method of automatically providing information on broadcast programs according to another exemplary embodiment of the present invention.

FIG. 6 is a flow chart illustrating a method of automatically providing information on broadcast programs according to another exemplary embodiment of the present invention.

Referring to FIG. 6, if a user selects a menu in order to set information for providing an EPG through the interface 106 of the TV and automatically sets information for providing broadcast programs by using an OSD displayed on a screen (step S200), the information is stored in the memory 103 and information on broadcast programs for each channel received from a broadcasting station is stored (step S210).

The controller 102 provides a broadcast program received through a specific channel selected by a user and periodically confirms an end time of a currently watched program (step S220). If the end time of the currently watched program is before a predetermined time set to automatically provide information on a broadcast program, the controller 102 searches information on the currently watched broadcast programs and EPG information on a next scheduled program and detects the detected information from the memory 103 (step S240).

Next, information on the currently watched broadcast program and information on the next scheduled program are automatically displayed in a partial region of the screen (step S250).

Information on broadcast programs is displayed in a partial region of an upper part or a side part of the TV screen, so that the broadcast program information does not occupy many parts of a currently watched screen.

If there is information on a plurality of scheduled broadcast programs to be displayed on the TV screen, the controller 102 controls the TV screen to display broadcast program information by conversion to information on a next program in order according to a key signal inputted through a remote controller by a user setting or to display broadcast program information by automatic sliding conversion at intervals of a setting time.

It is desirable that the information on the scheduled broadcast programs is information on broadcast programs which are to be broadcasted through the same channel as the currently watched program.

If there is information on a plurality of programs to be broadcasted, up/down/left/right arrow keys are provided. Moreover, information on programs which are to be broadcasted through the same channel as the currently watched program or information on programs which are to be broadcasted through other channels at the same time period as the scheduled broadcast program is provided.

Meanwhile, if the end time of the currently watched program is not before a predetermined time set to automatically provide information on a broadcast program, the broadcast program received through a specific channel selected by the user is provided on the screen and periodically confirms the end time of the currently watched broadcast program (step S230).

If a recording reservation signal for the scheduled broadcast program is inputted, the controller 102 sets the corresponding broadcast program selected by the user to be recorded. If a cancel signal for the broadcast program for which recording is scheduled is inputted, recording reservation setting is cancelled.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Various embodiments have been described in the best mode for carrying out the invention.

The present invention provides information on a currently watched broadcast program and information on a scheduled broadcast program by a simple key operation and can set or cancel a recording reservation for a broadcast program by using the provided information. Further, information on broadcast programs can be easily obtained without interrupting viewing of the currently watched broadcast program.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for processing data in a television, the method comprising:
   receiving information on a program guide;
   displaying a currently watching program in a full screen;
   displaying a title of a next scheduled program in a first region of the full screen and displaying a title of the currently watching program in a second region of the full screen based on the received information on the program guide while displaying the currently watching program in the full screen,
   simultaneously displaying at least two arrows within the first region around the title of the next scheduled program, wherein the title displayed within the first region and the title displayed within the second region overlap the currently watching program displayed in the full screen; and
   replacing the title of the next scheduled program with a title of another scheduled program in the first region in response to an input corresponding to one of the at least two arrows via a remote controller while a position of the displayed title of the currently watching program in the second region of the full screen is maintained,
   wherein the another scheduled program is scheduled after the next scheduled program or on another channel according to the information on the program guide.

2. The method of claim 1, wherein the at least two arrows are displayed in the first region based on there being information on at least one scheduled program available based on the information on the program guide.

3. The method of claim 1, wherein based on the input corresponding to a left arrow or right arrow of the at least two arrows, the title of the another scheduled program is displayed, wherein the another scheduled program is a program scheduled on the same channel after the next scheduled program.

4. The method of claim 1, wherein based on the input corresponding to an up arrow or down arrow of the at least two arrows, the title of the another scheduled program is displayed, wherein the another scheduled program is a program scheduled on a different channel during a same time period as the next scheduled program.

5. The method of claim 1, wherein the input relates to an arrow key of the remote controller.

6. The method of claim 1, wherein the first and second regions are both displayed to overlap an upper part of the full screen, and wherein the first region is adjacent to the second region.

7. The method of claim 1, further comprising:
providing a reservation function for the next scheduled program or the another scheduled program while the title of the next scheduled program or the another scheduled program is displayed within the first region, respectively.

8. The method of claim 1, wherein only one title of a scheduled program is displayed in the first region at a time.

9. The method of claim 1, wherein the next scheduled program is a program scheduled on the same channel after the currently watching program.

10. A receiver for processing data, the receiver comprising:
a controller configured to receive information on a program guide;
a memory configured to store the received information on the program guide; and
wherein the controller is further configured to:
cause a display associated with the receiver to display a currently watching program in a full screen;
cause the display to display a title of a next scheduled program in a first region of the full screen and display a title of the currently watching program in a second region of the full screen based on the stored information on the program guide while displaying the currently watching program in the full screen,
cause the display to simultaneously display at least two arrows within the first region around the title of the next scheduled program, wherein the title displayed within the first region and the title displayed within the second region overlap the currently watching program displayed in the full screen;
cause the display to replace the title of the next scheduled program with a title of another scheduled program in the first region in response to an input corresponding to one of the at least two arrows via a remote controller while a position of the displayed title of the currently watching program in the second region of the full screen is maintained,
wherein the another scheduled program is scheduled after the next scheduled program or on another channel according to the information on the program guide.

11. The receiver of claim 10, wherein the at least two arrows are displayed in the first region based on there being information on at least one scheduled program available based on the information on the program guide.

12. The receiver of claim 10, when based on the input corresponding to a left arrow or right arrow of the at least two arrows, the title of the another scheduled program is displayed, wherein the another scheduled program is a program scheduled on the same channel after the next scheduled program.

13. The receiver of claim 10, wherein based on the input corresponding to an up arrow or down arrow of the at least two arrows, the title of the another scheduled program is displayed, wherein the another scheduled program is a program scheduled on a different channel during a same time period as the next scheduled program.

14. The receiver of claim 10, wherein the input relates to an arrow key of the remote controller.

15. The receiver of claim 10, wherein the first and second regions are both displayed to overlap an upper part of the full screen, and wherein the first region is adjacent to the second region.

16. The receiver of claim 10, wherein the controller is further configured to cause the display to display a reservation function for the next scheduled program or the another scheduled program while the title of the next scheduled program or the another scheduled program is displayed within the first region, respectively.

17. The receiver of claim 10, wherein only one title of a scheduled program is displayed in the first region at a time.

18. The receiver of claim 10, wherein the next scheduled program is a program scheduled on the same channel after the currently watching program.

* * * * *